United States Patent
Suzuki et al.

(10) Patent No.: US 7,678,218 B2
(45) Date of Patent: Mar. 16, 2010

(54) PRODUCTION METHOD OF AN ELECTROACOUSTIC TRANSDUCER DIAPHRAGM, ELECTROACOUSTIC TRANSDUCER DIAPHRAGM, AND AN ELECTROACOUSTIC TRANSDUCER

(75) Inventors: Yoshiaki Suzuki, Kanagawa-ken (JP); Tomoaki Ogata, Gunma-ken (JP); Yoshiaki Tanaka, Kanagawa-ken (JP)

(73) Assignee: Victor Company of Japan, Limited, Yokohama-shi (JP)

( * ) Notice: Subject to any disclaimer, the term of this patent is extended or adjusted under 35 U.S.C. 154(b) by 384 days.

(21) Appl. No.: 11/653,256

(22) Filed: Jan. 16, 2007

(65) Prior Publication Data

US 2007/0164477 A1    Jul. 19, 2007

(30) Foreign Application Priority Data

Jan. 17, 2006  (JP) ............................ P2006-008692
Dec. 11, 2006  (JP) ............................ P2006-333779

(51) Int. Cl.
H04R 7/00    (2006.01)
(52) U.S. Cl. ....................................... 156/196; 181/169
(58) Field of Classification Search ................. 156/196; 181/169
See application file for complete search history.

(56) References Cited

U.S. PATENT DOCUMENTS

2004/0113117 A1*  6/2004  Matsumura et al. ........ 252/8.62
2004/0168851 A1    9/2004  Imamura et al.

FOREIGN PATENT DOCUMENTS

JP        10-304492        11/1998

OTHER PUBLICATIONS www.chuangfengchem.com/products-e4-3.htm, Copy righ(C) 2003, Supported by ChemNet ChinaChemNet Toocle, Shangyu Chaungfeng Chemical Factory.*

* cited by examiner

Primary Examiner—Jeff H Aftergut
Assistant Examiner—Jaeyun Lee
(74) Attorney, Agent, or Firm—The Nath Law Group; Jerald L. Meyer; Robert T. Burns

(57) ABSTRACT

A production method for an electroacoustic transducer diaphragm includes producing an adhered sheet by adhering a sheet member on a surface of a wooden sheet having a thickness of from 0.01 mm to 3 mm, and the sheet member being made of a material different from the wooden sheet, immersing the adhered sheet into one of a solution including 0.01-1 wt % of a penetrating agent and a solution including 0.01-1 wt % of penetrating agent and 0.01-20 wt % of a wetting agent, and molding the adhered sheet obtained by the immersing step so that the immersed adhered sheet has a predetermined shape of the electroacoustic transducer diaphragm.

5 Claims, 9 Drawing Sheets

PRODUCTION METHOD OF AN ELECTROACOUSTIC TRANSDUCER DIAPHRAGM, ELECTROACOUSTIC TRANSDUCER DIAPHRAGM, AND AN ELECTROACOUSTIC TRANSDUCER

CROSS REFERENCE TO RELATED APPLICATIONS

This application is based upon and claims the benefit of priority from the prior Japanese Patent Applications No. P2006-8692, P2006-8696, P2006-8699, filed on Jan. 17, 2006, P2006-333779, P2006-333780, P2006-333781, filed on Dec. 11, 2006, and P2006-338958, filed on Dec. 15, 2006; the entire contents of which are incorporated herein by reference.

BACKGROUND OF THE INVENTION

1. Field of the Invention

The present invention relates to a method of producing an electroacoustic transducer diaphragm, an electroacoustic transducer diaphragm, and an electroacoustic transducer using the electroacoustic transducer diaphragm.

2. Description of the Related Art

A speaker diaphragm using a sheet material made from wood (hereinafter referred to as a "wooden sheet") reproduces more natural sound compared to a speaker diaphragm using paper pulp or plastic. However, there is a technical problem in that the diaphragm is easily damaged when it is hot press molded into the shape of a diaphragm. In order to solve the problem, a production method has been proposed in Japanese Unexamined Patent Application Laid-Open (Koukai) No. 10(1998)-304492, which has been patented in Japanese Patent No. 3622421.

In the foregoing production method, "an adhered sheet" is provided by adhering a sheet of non-woven cloth or paper on one surface of a wooden sheet. The adhered sheet is impregnated with a solution containing a lubricant before it is hot press molded. The impregnation with the solution containing the lubricant makes the resulting wooden sheet more smooth and flexible and reduces occurrence of damages to the wooden sheet when hot pores molded by hot press molding.

However, according to the foregoing production method, the wooden sheet cannot provide sufficient smoothness and stretchability for the hot press molding. Thus, damages to the wooden sheet still occur in a mold during the hot press molding.

Additionally, the lubricant seeps out to the surface of the wooden sheet and burns into the mold during the hot press molding. The seeped lubricant makes it difficult to peel off the wooden sheet from the mold.

Also, the lubricant burned to the mold is partially removed and small pieces of the burnt lubricant stick to a molded product having the shape of the diaphragm. The small pieces detract the appearance of the speaker diaphragm.

Furthermore, since a process for removing the small pieces of the burnt lubricant from the speaker diaphragm is required, the productivity is decreased.

SUMMARY OF THE INVENTION

An object of the present invention is to provide a production method of an electroacoustic transducer diaphragm, an electroacoustic transducer diaphragm, and an electroacoustic transducer, which solves the foregoing problems.

In order to overcome the foregoing problems, in the present invention, an adhered sheet is prepared. The adhered sheet is produced by adhering a sheet (sheet member) which is made of a material different from a wooden sheet on at least one of the surfaces of the wooden sheet. The adhered sheet is immersed in a solution containing a proper amount of penetrating agent as an interfacial active agent or with a solution containing a proper amount of a penetrating agent and a wetting agent before hot press molding into a predetermined shape as a diaphragm.

The penetrating agent used in the present invention includes, for example, one or more of sodium lauryl sulfate, dialkyl sulfosuccinate, fatty acid amide sulfonate, alkyl naphthalenesulfonate, alkylphenol ethylene oxide adduct, middle or higher alcohol ethylene oxide adduct, oleic butyl sulfated compound, and the like.

The wetting agent used in the present invention includes, for example, one or more of monovalent alcohol, dihydric alcohol, triatomic alcohol, ethylene glycol, butyl glycols, propyl glycols, sugars, mucopolysaccharides, sugar alcohols, water-soluble multiple proteins, and the like.

With regard to the concentration of the penetrating agent, a penetration effect into a wood material is achieved when 0.001 wt % or more of the penetrating agent is added. An effect of stability penetration is achieved when 0.1 wt % or more of the penetrating agent is added. Since the deterioration durability of the diaphragm is affected by the penetrating agent residue in the wooden sheet, it is preferable that the concentration of the penetrating agent is minimized. Therefore, the concentration of the penetrating agent can be set lower than 1 wt %.

With regard to the concentration of the wetting agent, the penetration effect into the wood material is achieved when 0.01 wt % or more of wetting agent is added. The effect of stability penetration is achieved when 0.1 wt % or more of the wetting agent is added. Since the deterioration durability of the diaphragm is affected by the wetting agent residue in the wooden sheet, it is preferable that the concentration of wetting agent is minimized. Therefore, the concentration of the wetting agent can be set lower than 20 wt % and, more preferably, the concentration of the wetting agent is set lower than 10 wt % for a wooden sheet with thickness in a range from 0.01 mm to 1 mm.

As a "sheet (sheet member) made of a material different from a wooden sheet," for example, non-woven cloth, paper, or woven cloth can be used. When an electroacoustic transducer diaphragm according to the present invention is applied to earphones or headphones, a film such as a nonrigid plastic film may be used. When the electroacoustic transducer diaphragm according to the present invention is applied to speakers, sponge, cardboard, or glass fiber may be used in addition to the nonrigid plastic film. When it is needed to reduce the thickness of the wooden sheet itself, film or paper is preferable material for the "sheet made of a material different from a wooden sheet," and other materials are preferable for other cases.

When a sheet having even equal strength in vertical and horizontal directions is used as the adhered sheet, for example, woven cloth such as 2-axis woven cloth or 4-axis woven cloth may be adhered. Since woven cloth is easily adjustable in strength of required portion or axis directions, it easily provides a light and strong diaphragm.

The adhered sheet is not limited to a sheet produced by adhering a sheet of non-woven cloth, paper or woven cloth on one surface of a wooden sheet and adhering a sheet of non-woven cloth, paper or woven cloth on both sides of a wooden sheet may be used.

The non-woven cloth, paper, or woven cloth should not be always adhered on the entire surface of the wooden sheet and may be adhered on part of the wooden sheet. Further, the adhered non-woven cloth, paper or woven cloth can be removed from the wooden sheet after hot press molding.

The preferable range of thickness of the wooden sheet itself is in the range from 0.01 mm to 3 mm. Particularly, the thickness of a small diaphragm used for earphones and headphones is preferably from 0.01 mm and less than 0.1 mm. The thickness of a normal diaphragm is preferably from 0.01 mm to 0.3 mm that is a thickness easily provided by peeling or slicing the wood material. On the other hand, the thickness of a large diaphragm adapted for low pitch sounds is preferably between 1 mm to 2 mm or between more than 2 mm and 3 mm.

The reason for impregnating a workpiece with solution containing phenol resin is that a diaphragm made of only natural material including organic matter may be easily damaged and it is difficult to provide practical strength over time when the natural material is used as a speaker diaphragm. Such practical strength is realized by the workpiece impregnating with solution containing phenol resin. According to the present invention, a wooden sheet is impregnated with solution containing a penetrating agent and a wetting agent to make the wooden sheet flexible and, further, the penetrating agent and the wetting agent work to provide an effect in which the wooden sheet absorbs more moisture. As a result the wooden sheet is more flexible so that occurrence of damage to the wooden sheet in a mold under hot press molding is sufficiently reduced and the yield rate is improved. Here, according to the degrees of flexible, stretch properties or moisture absorbability of a wooden sheet, the weight percentage of water, penetrating agent, and wetting agent is controlled. When the wooden sheet substantially evenly stretches in a mold during hot press molding, an electroacoustic transducer diaphragm having an even thickness, as a whole, can be obtained. Thus, acoustic characteristics of electroacoustic transducers such as speakers, earphones, and headphones using the electroacoustic transducer diaphragm are improved.

The penetrating agent and the wetting agent will not cause burn outs in a mold when a workpiece is hot press molded, so those materials will not interfere with removing the workpiece from the mold or cause blots on the workpiece or mold. Therefore, in addition to the yield rate being improved, the productivity is improved and manufacturing cost is reduced since a process for removing burnouts from the diaphragm and the mold is not required.

DESCRIPTION OF THE PREFERRED EMBODIMENTS

Various embodiments of the present invention will be described with reference to the accompanying drawings.

First Embodiment

Figure 1:
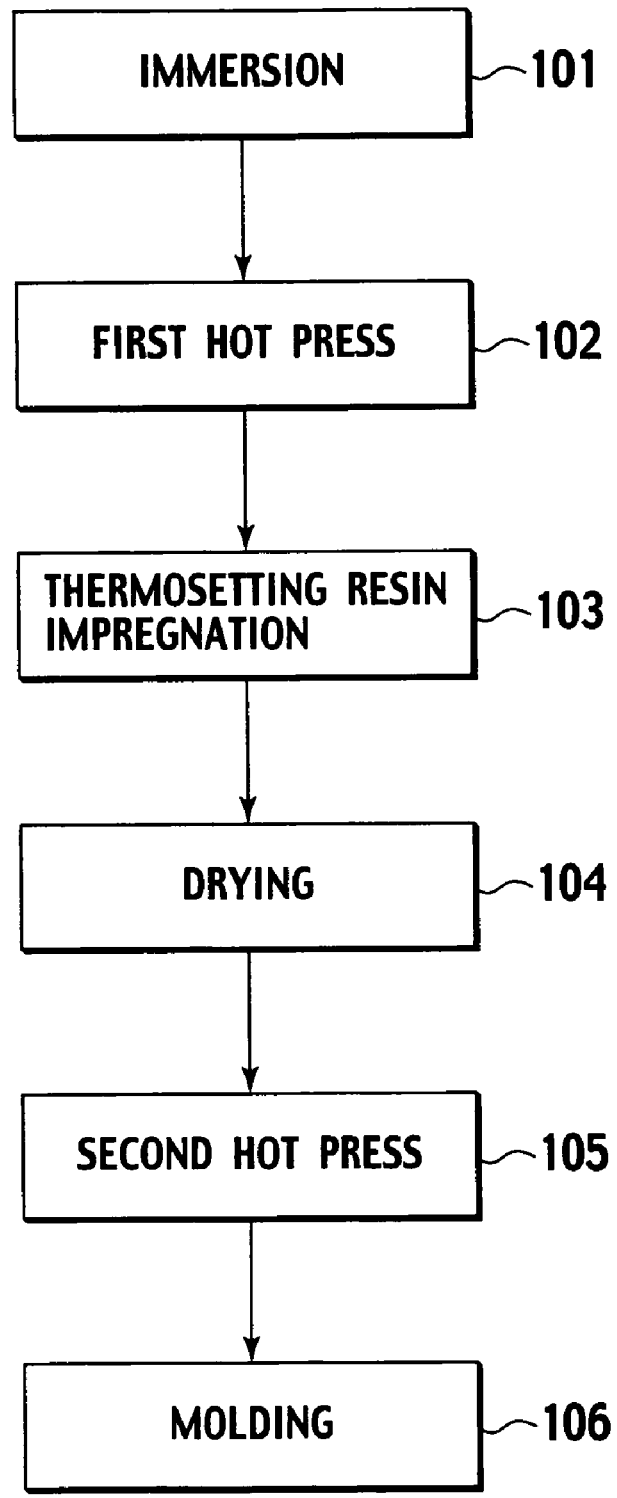
FIG. 1 is a flow chart showing a production method of an electroacoustic transducer diaphragm according to the present invention.

A first embodiment of the present invention will be described below. FIG. 1 is a flow chart showing a production method of an electroacoustic transducer diaphragm according to the present invention. FIG. 2 is an explanatory diagram of the production method according to the first embodiment.

Figure 2A:
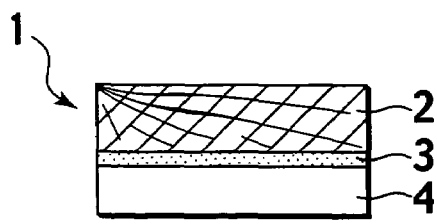
FIGS. 2A to 2F are explanatory diagrams of the production method according to a first embodiment of the present invention.
Figure 2B:
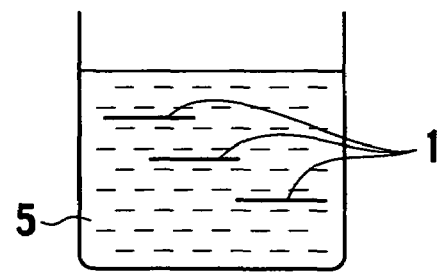

Firstly, in a immersing step 101 in FIG. 1, as shown in FIG. 2A, an adhered sheet 1 is produced by adhering a non-woven cloth 4 on one surface of a wooden sheet 2 having a thickness of approximately 0.25 mm via an adhesive layer 3 therebetween. The adhered sheet 1 is cut into a preferred size. As shown in FIG. 2B, the adhered sheet 1 is immersed in a solution 5 which contains 0.05 wt % of sodium butylnaphthalene sulfonate. The adhered sheet 1 is kept immersed until it becomes flexible (approximately 20 minutes).

Figure 2C:
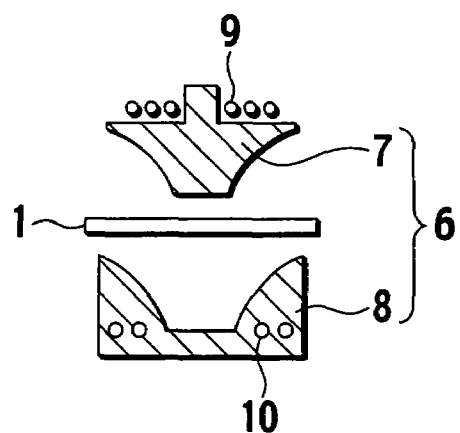

In a first hot press molding step 102 in FIG. 1, as shown in FIG. 2C, the flexible adhered sheet 1 is hot press molded by a mold 6 which is heated to temperatures of 100° C. or more in advance. The mold 6 is of a male-female type which is composed of a male mold 7 and a female mold 8 and includes heaters 9, 10.

The wooden sheet 2 is impregnated with sodium butylnaphthalenesulfonate and the sodium butylnaphthalenesulfonate works to make the wooden sheet 2 stretchable and absorb more moisture. As a result, elongation of the wooden sheet 2 can be realized and the wooden sheet 2 will not be easily damaged in a hot press molding.

Further, since the solution 5 does not contain any lubricant, no extraneous material will be generated in the mold 6 when the workpiece is hot press molded. Thus, it prevents the adhered sheet 1 burned in the mold 6 and a preferable molded product having no damage, such as a crack, is obtained.

Figure 2D:
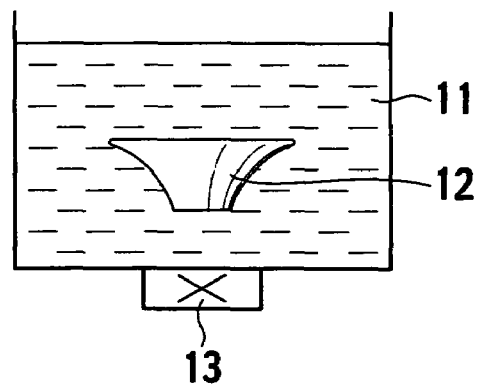

In a thermosetting resin impregnating step 103 in FIG. 1, a molded product 12 obtained in the first hot press molding step 102 is immersed in thermosetting resin solution 11, as shown in FIG. 2D. At the same time, an oscillation implemented by an ultrasonic oscillator 13 is induced in the thermosetting resin solution 11. The molded product 12 is immersed until it is sufficiently impregnated with the thermosetting resin (approximately 5 minutes). Impregnation of the molded product 12 with such an ultrasonic wave reduces the time required for sufficient impregnation of the thermosetting resin by about one-tenth, compared to a case when impregnation is implemented without ultrasonic oscillation.

Figure 2E:
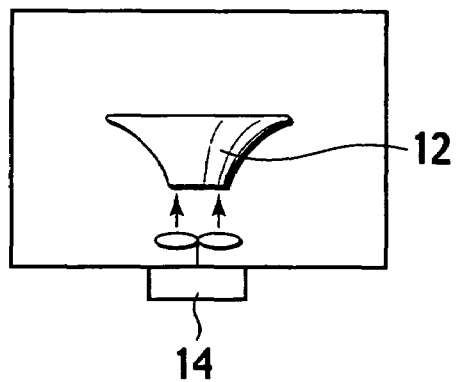

In a drying step 104 in FIG. 1, the molded product 12 which is impregnated with the thermosetting resin is dried artificially at room temperature by blowing air with a fan 14 as shown in FIG. 2E.

In a second hot press molding step 105 in FIG. 1, the mold 6 as shown in FIG. 2C is heated to temperatures of 150° C. or more in advance and the molded product 12 is hot press molded again.

As described above, the molded product 12, which is formed in a diaphragm shape in the first hot press molding step 102, is firstly impregnated with thermosetting resin, and then, hot press molded in the second hot press molding step 105. With this process, shape retention property of the molded product 12 is improved to prevent an easy return to its original shape so that the yield rate is increased.

Figure 2F:
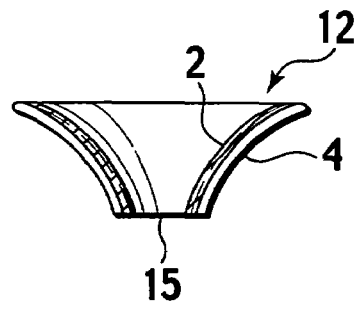

In a shape forming step 106 in FIG. 1, by use of a punching die having a predetermined shape, a central opening is formed in the molded product 12 and the molded product 12 is formed into a predetermined external size. Then, the molded product 12 is coated with moisture resistant resin. With this process, as shown in FIG. 2F, the molded product 12 (speaker diaphragm) in a flared shape having a central opening 15 is obtained.

Second Embodiment

A second embodiment of the present invention will be explained below with reference to FIGS. 1 and 3A to 3F.

Figure 3A:
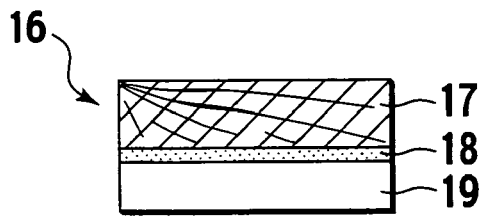
FIGS. 3A to 3F are explanatory diagrams of the production method according to a second embodiment of the present invention.
Figure 3B:
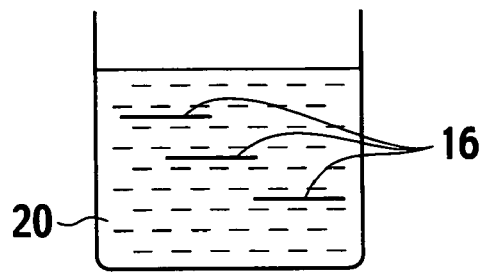

Firstly, in a immersing step 101 in FIG. 1, as shown in FIG. 3A, an adhered sheet 16 is produced by adhering a sheet of Japanese paper 19 on one surface of a wooden sheet 17 having a thickness of approximately 0.25 mm via an adhesive layer 18 therebetween. As shown in FIG. 3B, the adhered sheet 16 is cut into a preferred size and immersed in a solution 20 which contains 5 wt % of ethylene glycol and 0.1 wt % of sodium di(-2-ethylhexyl) sulfosuccinate. The adhered sheet 16 is kept immersed until it becomes flexible (approximately 20 minutes). Here, small amount of ethyl alcohol is dissolved in the solution 20 to reduce the time of drying the workpiece.

Figure 3C:
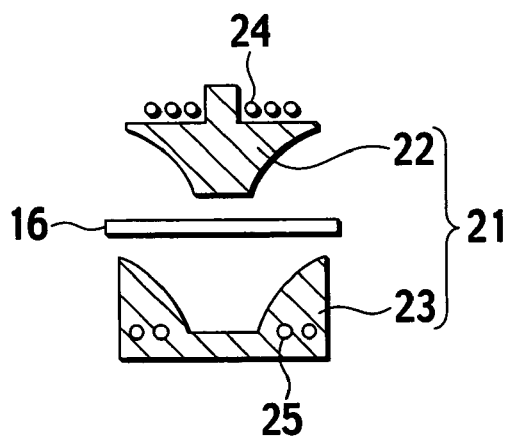

In a first hot press molding step 102 in FIG. 1, as shown in FIG. 3C, the flexible adhered sheet 16 is hot press molded by a mold 21 which is heated to temperatures of 100° C. or more in advance. The mold 21 is of a male-female type which is composed of a male mold 22 and a female mold 23 and includes heaters 24, 25. Since the solution 20 does not contain any lubricant, no extraneous material will be generated in the mold 21 when the workpiece is hot press molded. Thus, it prevents the adhered sheet 16 burned in the mold 21 and a preferable molded product having no damage, such as a crack, is obtained.

Figure 3D:
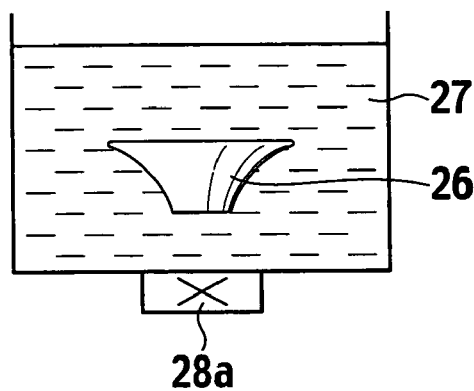

In a thermosetting resin impregnating step 103 in FIG. 1, a molded product 26 obtained in the first hot press molding step 102 is immersed in thermosetting resin solution 27, as shown in FIG. 3D. At the same time, an oscillation implemented by an ultrasonic oscillator 28a is induced in the thermosetting resin solution 27. The molded product 26 is immersed until it is sufficiently impregnated with the thermosetting resin (approximately 5 minutes). Impregnation of the molded product 26 with such an ultrasonic wave reduces the time required for sufficient impregnation of the thermosetting resin by about at one-tenth, compared to a case when impregnation is implemented without ultrasonic oscillation. Further, the obtained molded product 26, which is placed under a condition at temperature of 60° C., 90% of relative humidity for 24 hours after impregnation, is observed. Observed molded product 26 shows that impregnation of the molded product 26 with ultrasonic oscillation prevents deformations of the obtained molded product 26, compared to a case when impregnation is implemented without ultrasonic oscillation.

Figure 3E:
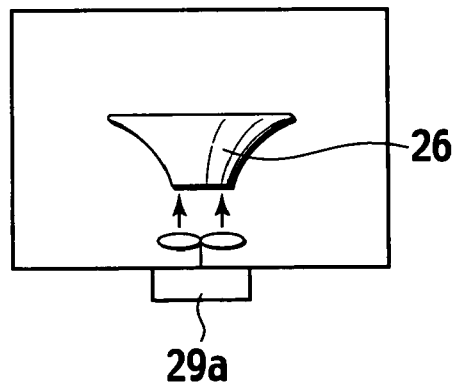

In a drying step 104 in FIG. 1, the molded product 26 which is impregnated with the thermosetting resin is dried artificially at room temperature by blowing air with a fan 29a as shown in FIG. 3E. It is found that such an artificial drying at room temperature air reduces damage occurrence provided by a subsequent second hot press molding step 105 by about one-tenth, compared to a case when it is dried at high temperature (for example, drying with an infrared lamp or artificial drying with hot air).

In the second hot press molding step 105 in FIG. 1, the mold 21 shown in FIG. 3C is heated to temperatures of 150° C. or more in advance and the molded product 26 is hot press molded again.

As described above, the molded product 26 which is formed in a diaphragm shape in the first hot press molding step 102 is firstly impregnated with thermosetting resin, and then, hot press molded again in the second hot press molding step 105. With this process, shape retention property of the molded product 26 is improved to prevent an easy return to its original shape easily so that the yield rate is increased.

Figure 3F:
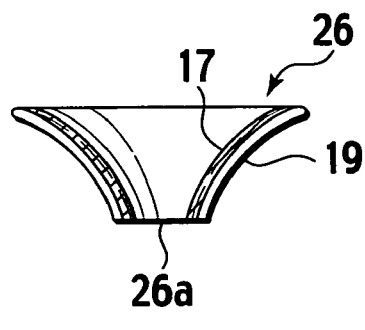

In a shape forming step 106 in FIG. 1, in use of a punching die in a predetermined shape, a central opening is formed in the molded product 26 and the molded product 26 is formed into a predetermined external size. Then, the molded product 26 is coated with moisture resistant resin. With this process, as shown in FIG. 3F, the molded product 26 (speaker diaphragm) in a flared shape having a central opening 26a is obtained.

Third Embodiment

A third embodiment of the present invention will be described below with reference to FIGS. 1 and 4A to 4F.

Figure 4A:
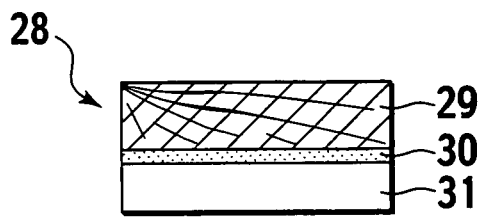
FIGS. 4A to 4F are explanatory diagrams of the production method according to a third embodiment of the present invention.
Figure 4B:
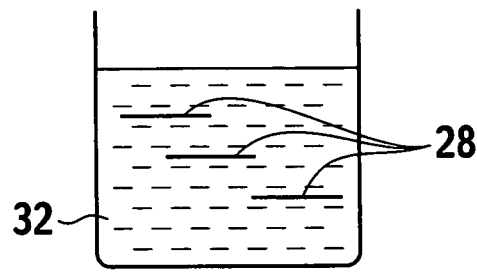

Firstly, in a immersing step 101 in FIG. 1, as shown in FIG. 4A, an adhered sheet 28 is produced by adhering a non-woven cloth 31 on one surface of a wooden sheet 29 having a thickness of approximately 0.5 mm via an adhesive layer 30 therebetween. As shown in FIG. 4B, the adhered sheet 28 is cut into preferred size and immersed in a solution 32 which contains 0.1 wt % of sodium di(-2-ethylhexyl) sulfosuccinate. The adhered sheet 28 is kept immersed until it becomes flexible (approximately 20 minutes).

Figure 4C:
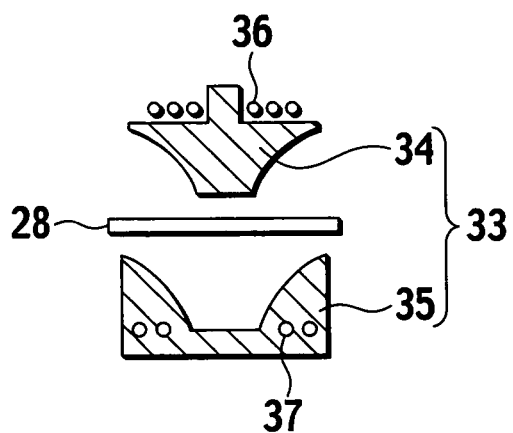

In a first hot press molding step 102 in FIG. 1, as shown in FIG. 4C, the flexible adhered sheet 28 is hot press molded by a mold 33 which is heated to temperatures of 100° C. or more in advance. The mold 33 is a mold of a male-female type which is composed of a male mold 34 and a female mold 35 and includes heaters 36, 37. Since the solution 32 does not contain any lubricant, no extraneous material will be generated in the mold 33 when the workpiece is hot press molded. Thus, it prevents the adhered sheet 28 burned in the mold 33 and a preferable molded product having no damage, such as a crack, is obtained.

Figure 4D:
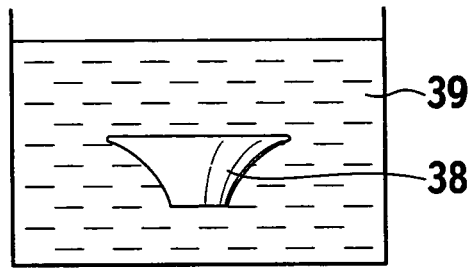

In a thermosetting resin impregnating step 103 in FIG. 1, the molded product 38 obtained in the first hot press molding step 102 is immersed in thermosetting resin solution 39, as shown in FIG. 4D. The molded product 38 is immersed until it is sufficiently impregnated with the thermosetting resin (approximately 60 minutes).

Figure 4E:
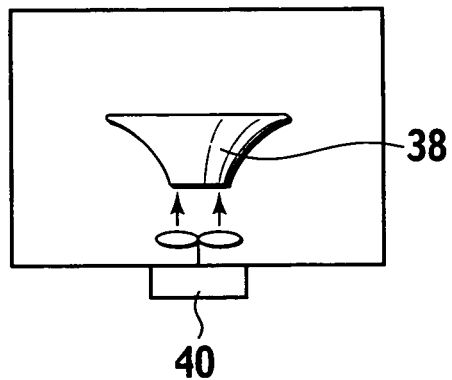

In a drying step 104 in FIG. 1, the molded product 38 which is impregnated with the thermosetting resin is dried artificially at a room temperature by blowing air with a fan 40 as shown in FIG. 4E. It is found that such an artificial drying at room temperature air reduces damage occurrence provided by a subsequent second hot press molding step 105 by about one-tenth, compared to a case when it is dried at high temperature (for example, drying with an infrared lamp or artificial drying with hot air).

In the second hot press molding step 105 in FIG. 1, the mold 33 shown in FIG. 4C is heated to temperatures of 150° C. in advance or more and the molded product 38 is hot press molded again.

As described above, the molded product 38, which is formed in a diaphragm shape in the first hot press molding step 102, is firstly impregnated with thermosetting resin, and then, hot press molded again. With this process, shape retention property of the molded product 38 is improved to prevent an easy return to its original shape so that the yield rate is increased.

Figure 4F:
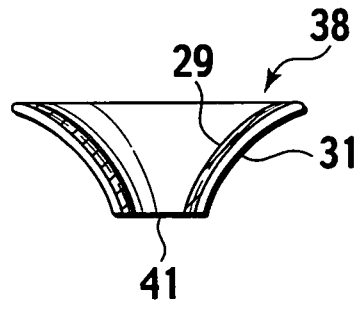

In a shape forming step 106 in FIG. 1, in use of a punching die having a predetermined shape, a central opening 41 is formed in the molded product 38 and the molded product 38 is formed into a predetermined external size. Then, the molded product 38 is coated with moisture resistant resin. With this process, as shown in FIG. 4F, the molded product 38 in a flared shape having a central opening 41 is obtained.

Fourth Embodiment

A fourth embodiment of the present invention will be described below with reference to FIGS. 1 and 5A to 5E.

Figure 5A:
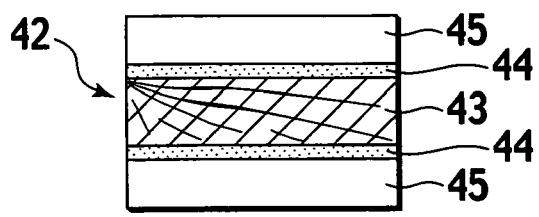
FIGS. 5A to 5F are explanatory diagrams of the production method according to a fourth embodiment of the present invention.
Figure 5B:
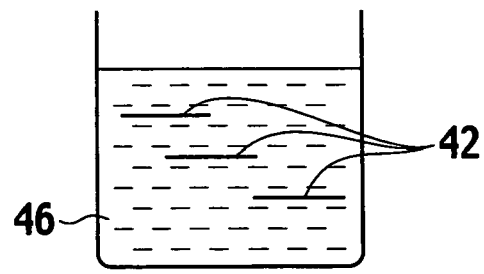

Firstly, in a immersing step 101 in FIG. 1, as shown in FIG. 5A, an adhered sheet 42 is produced by adhering non-woven clothes 45 on both surfaces of a wooden sheet 43 having a thickness of approximately 0.25 mm via an adhesive layers 44 therebetween. As shown in FIG. 5B, the adhered sheet 42 is cut into a preferred size and immersed in a solution 46 which contains 10 wt % of ethyl alcohol and 0.05 wt % of sodium di(2-ethylhexyl sulfosuccinate. The adhered sheet 42 is kept immersed until it becomes flexible (approximately 20 minutes).

Figure 5C:
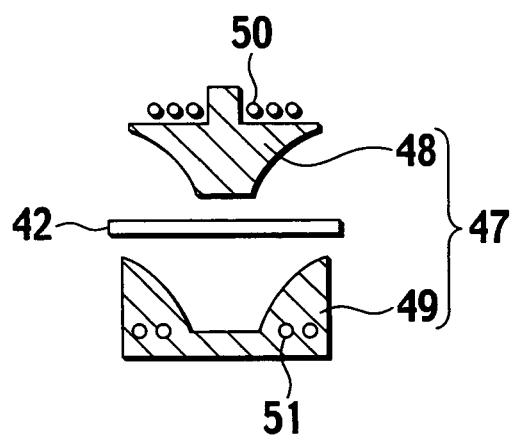

In a first hot press molding step 102 in FIG. 1, as shown in FIG. 5C, the flexible adhered sheet 42 is hot press molded by a mold 47 which is heated to temperatures of 100° C. or more in advance. The mold 47 is a mold of a male-female type which is composed of a male mold 48 and a female mold 49 and includes heaters 50, 51. In this process, since the solution 46 does not contain any lubricant, no extraneous material will be generated in the mold 47 when the workpiece is hot press molded. Thus, it prevents the adhered sheet 42 burn in the mold 47. In addition, due to the stiffening effect of the non-woven clothes 45 adhered on both surfaces of the adhered sheet 42, damages, such as cracks, are reduced and productivity is increased.

Figure 5D:
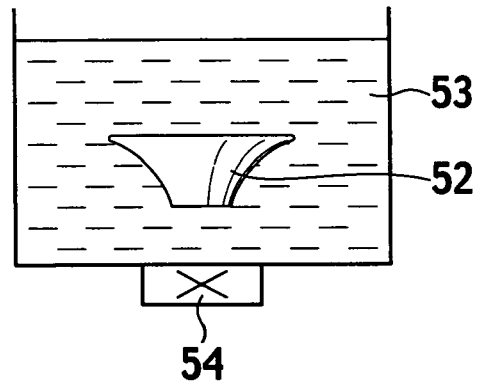

In a thermosetting resin impregnating step 103 in FIG. 1, the molded product 52 obtained in the first hot press molding step 102 is impregnated in thermosetting resin solution 53, as shown in FIG. 5D. At the same time, an oscillation implemented by an ultrasonic oscillator 54 is induced in the thermosetting resin solution 53. The molded product 52 is immersed until it is sufficiently impregnated with the thermosetting resin (approximately 5 minutes). Impregnation of the molded product 52 with such an ultrasonic wave reduces the time required for sufficient impregnation of the thermosetting resin by about at one-tenth, compared to a case when impregnation is implemented without ultrasonic oscillation.

Figure 5E:
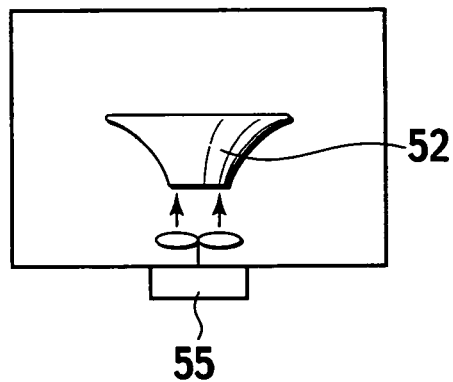

In a drying step 104 in FIG. 1, the molded product 52 which is impregnated with the thermosetting resin is dried artificially at a room temperature by blowing air with a fan 55 as shown in FIG. 5E.

In a second hot press molding step 105 in FIG. 1, the mold 47 shown in FIG. 5C is heated to temperatures of 150° C. or more in advance and the molded product 52 is hot press molded again.

As described above, the molded product 52 which is formed in a diaphragm shape in the first hot press molding step 102 is firstly impregnated with thermosetting resin, and then, hot press molded again. With this process, shape retention property of the molded product 52 is improved to prevent an easy return to its original shape so that the yield rate is increased.

Figure 5F:
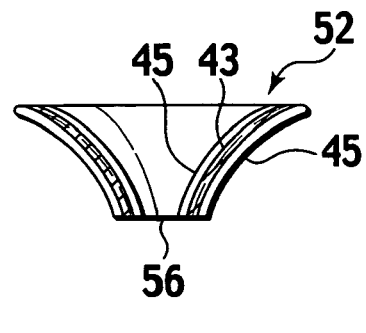

In a shape forming step 106 in FIG. 1, in use of a punching die having a predetermined shape, a central opening is formed in the molded product 52 and the molded product 52 is formed into a predetermined external size. Then, the molded product 52 is coated with moisture resistant resin. With this process, as shown in FIG. 5F, the molded product 52 (speaker diaphragm) in a flared shape having a central opening 56 is obtained. Here, when a woodgrain pattern is printed on the surface of the non-woven cloth 45 which is placed to the inner side of the molded product 52, it fits the demand of customers who prefer woodgrain textures.

Fifth Embodiment

A fifth embodiment of the present invention will be described below with reference to FIGS. 1 and 6A to 6E.

Figure 6A:
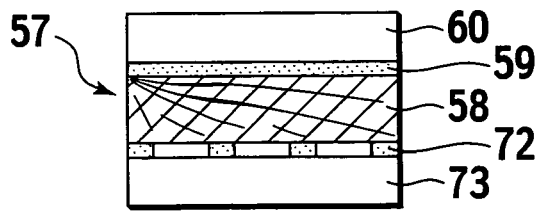
FIGS. 6A to 6F are explanatory diagrams of the production method according to a fifth embodiment of the present invention.
Figure 6B:
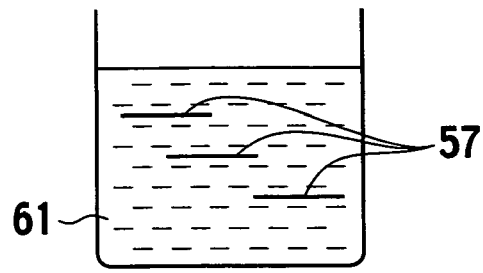
Figure 7A:
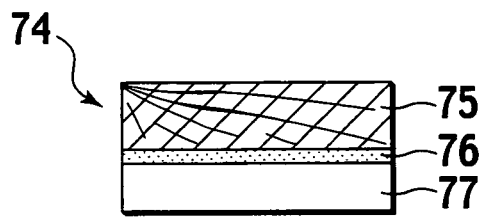
FIGS. 7A to 7F are explanatory diagrams of the production method according to a sixth embodiment of the present invention.

Firstly, in a immersing step 101 in FIG. 1, as shown in FIG. 7A, an adhered sheet 57 is produced by adhering a non-woven cloth 60 on one surface of a wooden sheet 58 having a thickness of approximately 0.25 mm via an adhesive layer 59 therebetween, and a non-woven cloth 73 on the other side of the wooden sheet 58 via a spotted adhesive layer 72 therebetween. As shown in FIG. 6B, the adhered sheet 57 is cut into a preferred size and immersed in a solution 61 which contains 5 wt % of glucose and 0.02 wt % of sodium lauryl sulfate. The adhered sheet 57 is kept immersed until it becomes flexible (approximately 20 minutes).

Figure 6C:
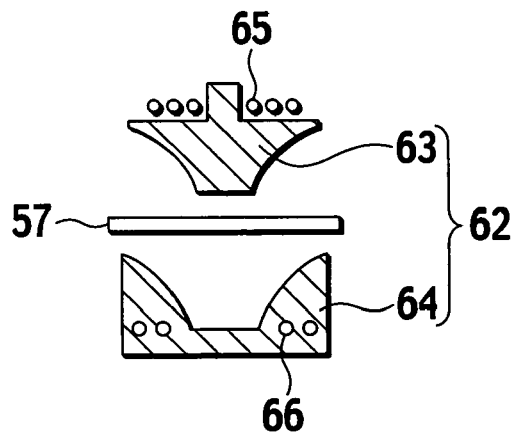

In a first hot press molding step 102 in FIG. 1, as shown in FIG. 6C, the flexible adhered sheet 57 is hot press molded by a mold 62 which is heated to temperatures of 100° C. or more in advance. The mold 62 is a mold of a male-female type which is composed of a male mold 63 and a female mold 64 and includes heaters 65, 66. Since the solution 61 does not contain any lubricant, no extraneous material will be generated in the mold 62 when the workpiece is hot press molded and it prevents the adhered sheet 57 burned in the mold 62. In addition, since the stiffening effect of the non-woven clothes 60, 73 adhered on both surfaces of the adhered sheet 58 prevents damages of the adhered sheet 57, productivity is increased. After the hot press molding, the non-woven cloth 73, spottedly adhered inside of the adhered sheet 57, is removed from the wooden sheet 58.

Figure 6D:
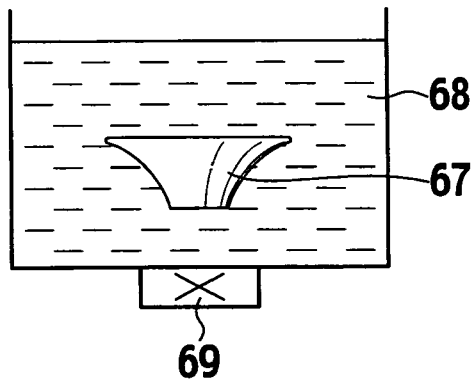

In a thermosetting resin impregnating step 103 in FIG. 1, the molded product 67, in which the non-woven cloth 73 is removed and obtained in the first hot press molding step 102, is impregnated in thermosetting resin solution 68, as shown in FIG. 6D. At the same time, an oscillation implemented by an ultrasonic oscillator 69 is induced in the thermosetting resin solution 68. The molded product 67 is immersed until it is sufficiently impregnated with the thermosetting resin 68 (approximately 5 minutes). Impregnation of the molded product 67 with such an ultrasonic wave reduces the time required for sufficient impregnation of the thermosetting resin by about at one-tenth, compared to a case when impregnation is implemented without ultrasonic oscillation.

Figure 6E:
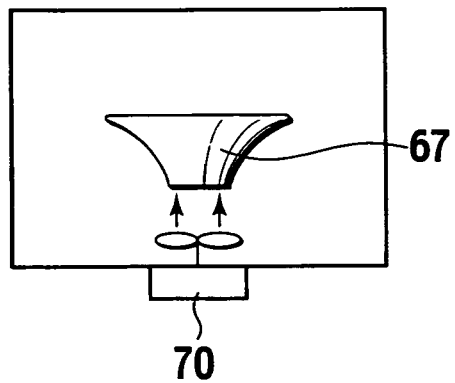

In a drying step 104 in FIG. 1, the molded product 67 which is impregnated with the thermosetting resin is dried artificially at a room temperature by blowing air with a fan 70 as shown in FIG. 6E.

In a second hot press molding step 105 in FIG. 1, the mold 62 shown in FIG. 6C is heated to temperatures of 150° C. or more in advance and the molded product 67 is hot press molded again.

As described above, the molded product 67 which is formed in a diaphragm shape in the first hot press molding step 102 is firstly impregnated with thermosetting resin, and then, hot press molded again. With this process, shape retention property of the molded product 67 is improved to prevent an easy return to its original shape so that the yield rate is increased.

Figure 6F:
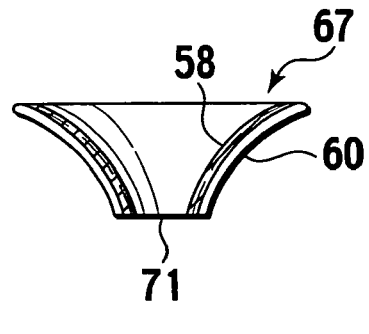

In a shape forming step 106 in FIG. 1, in use of a punching die having a predetermined shape, a central opening is formed in the molded product 67 and the molded product 67 is formed into a predetermined external size. Then, the molded product 67 is coated with moisture resistant resin. With this process, as shown in FIG. 6F, the molded product 67 (speaker diaphragm) in a flared shape having a central opening 71 is obtained.

Sixth Embodiment

A sixth embodiment of the present invention will be described below with reference to FIGS. 1 and 7A to 7F.

Figure 7B:
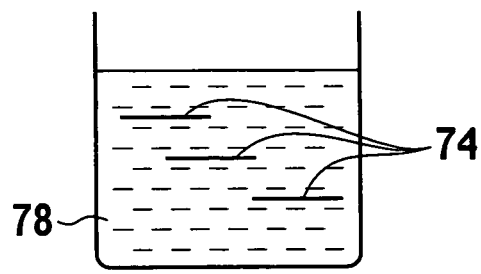

Firstly, in a immersing step 101 in FIG. 1, as shown in FIG. 7A, an adhered sheet 74 is produced by adhering a 4-axis woven cloth 77 on one surface of a wooden sheet 75 having a thickness of approximately 0.25 mm via an adhesive layer 76 therebetween. As shown in FIG. 7B, the adhered sheet 74 is cut into preferred size and immersed in a solution 78 which contains 5 wt % of glucose and 0.05 wt % of sodium di(2-ethylhexyl) sulfosuccinate. The adhered sheet 74 is kept immersed until it becomes flexible (approximately 20 minutes).

Figure 7C:
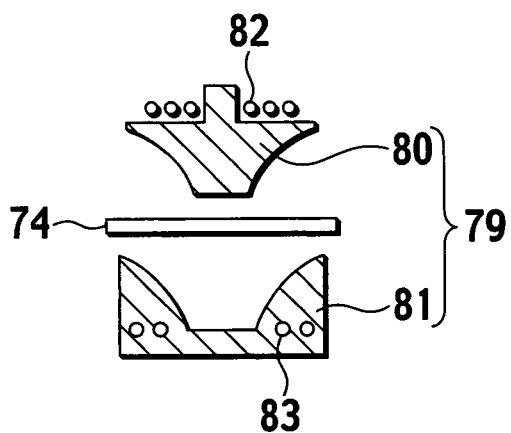

In a first hot press molding step 102 in FIG. 1, as shown in FIG. 7C, the flexible adhered sheet 74 is hot press molded by a mold 79 which is heated to temperatures of 100° C. or more in advance. The mold 79 is a mold of a male-female type which is composed of a male mold 80 and a female mold 81 and includes heaters 82, 83. In this process, since the solution 78 does not contain any lubricants no extraneous material will be generated in the mold 79 when the workpiece is hot press molded. Thus, it prevents that the adhered sheet 74 burned in the mold 79. Further, the 4-axis woven cloth 77 on the surface of the adhered sheet 74 strengths the adhered sheet 74 evenly in vertical and horizontal directions so that damages are reduced and productivity is increased.

Figure 7D:
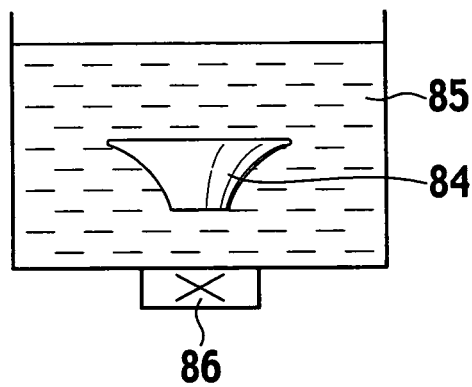

In a thermosetting resin impregnating step 103 in FIG. 1, a molded product 84 obtained in the first hot press molding step 102 is immersed in thermosetting resin solution 85, as shown in FIG. 7D. At the same time, an oscillation implemented by an ultrasonic oscillator 86 is induced in the thermosetting resin solution 86. The molded product 84 is immersed until it is sufficiently impregnated with the thermosetting resin (approximately 5 minutes). Impregnation of the molded product 84 with such an ultrasonic wave reduces the time required for sufficient impregnation of the thermosetting resin by about at one-tenth, compared to a case when impregnation is implemented without ultrasonic oscillation.

Figure 7E:
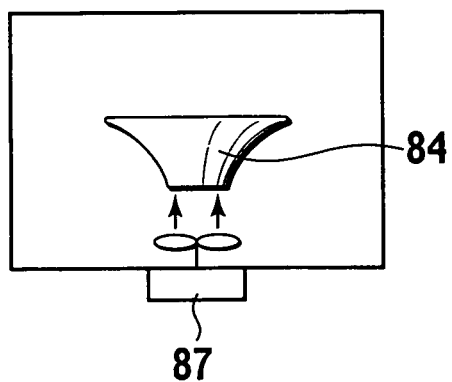

In a drying step 104 in FIG. 1, the molded product 84 which is impregnated with the thermosetting resin is dried artificially at room temperature by blowing air with a fan 87 as shown in FIG. 7E.

In a second hot press molding step 105 in FIG. 1, the mold 79 shown in FIG. 7C is heated to temperatures of 150° C. or more in advance and the molded product 84 is hot press molded again.

As described above, the molded product 84, which is formed in a diaphragm shape in the first hot press molding step 102, is firstly impregnated with thermosetting resin, and then, hot press molded again. With this process, shape retention of the molded product 84 is improved to prevent an easy return to its original shape so that the yield rate is increased.

Figure 7F:
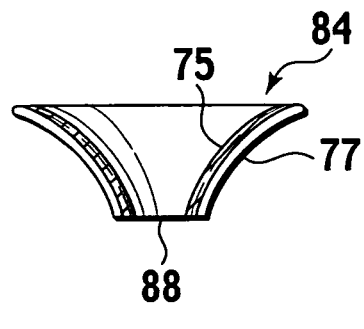

In a shape forming step 106 in FIG. 1, by use of a punching die having a predetermined shape, a central opening is formed in the molded product 84 and the molded product 84 is formed into a predetermined external size. Then, the molded product 84 is coated with moisture resistant resin. With this process, as shown in FIG. 7F, the molded product 84 (speaker diaphragm) in a flared shape having a central opening 88 is obtained.

Seventh Embodiment

A seventh embodiment of the present invention will be described below with reference to FIGS. 1 and 2A to 2F.

Firstly, in a immersing step 101 in FIG. 1, as shown in FIG. 2A, an adhered sheet 1 is produced by adhering a non-woven cloth 4 on one surface of a wooden sheet 2 having a thickness of approximately 0.25 mm via an adhesive layer 3 therebetween. As shown in FIG. 2B, the adhered sheet 1 is cut into preferred size and immersed in a solution 5 which contains 0.05 wt % of sodium butylnaphthalenesulfonate. The adhered sheet 1 is kept immersed until it becomes flexible (approximately 20 minutes). Here, sodium butylnaphthalenesulfonate is a kind of sodium alkylnaphthalenesulfonate and a penetrating agent. Further, the non-woven cloth 4 works as a reinforcing material to reinforce the wooden sheet 2. For example, the non-woven cloth 4 is a paper prepared by weaving pieces of string which is made of paper pulp.

In a first hot press molding step 102 in FIG. 1, as shown in FIG. 2C, the adhered sheet 1 is hot press molded by a mold 6 which is heated to temperatures of 100° C. or more in advance. The mold 6 is a mold of a male-female type which is composed of a male mold 7 and a female mold 8 and includes heaters 9, 10.

The wooden sheet 2 is impregnated with sodium butylnaphthalenesulfonate so that the sodium butylnaphthalenesulfonate works to make the wooden sheet 2 stretchable and absorb more moisture. As a result, elongation of the wooden sheet 2 can be realized and the wooden sheet 2 will not be easily damaged in the mold 6 during a hot press molding.

Since the solution 5 does not contain any lubricant, no extraneous material will be generated on the mold 6 when the workpiece is hot press molded. Thus, it prevents the adhered sheet 1 is burned in the mold 6 and a preferable molded product having no damage, such as a crack, is obtained.

In a thermosetting resin impregnating step 103 in FIG. 1, the molded product 12 obtained in the first hot press molding step 102 is immersed in thermosetting resin solution 11, as shown in FIG. 2D. At the same time, an oscillation implemented by an ultrasonic oscillator 13 is induced in the thermosetting resin solution 11. The molded product 12 is immersed until it is sufficiently impregnated with the thermosetting resin (approximately 5 minutes). Impregnation of the molded product with such an ultrasonic wave reduces the time required for sufficient impregnation of the thermosetting resin by about at one-tenth, compared to a case when impregnation is implemented without ultrasonic oscillation.

In a drying step 104 in FIG. 1, the molded product 12 which is impregnated with the thermosetting resin is dried artificially at room temperature by blowing air with a fan 14 as shown in FIG. 2E.

In a second hot press molding step 105 in FIG. 1, the mold 6 shown in FIG. 2C is heated to temperatures of 150° C. or more in advance and the molded product 12 is hot press molded again.

As described above, the molded product 12 which is formed in a diaphragm shape in the first hot press molding step 102 is firstly impregnated with thermosetting resin, and then, hot press molded in the second hot press molding step 105. With this process, shape retention property of the molded product 12 is improved to prevent an easy return to its original shape so that the yield rate is increased.

Figure 9A:
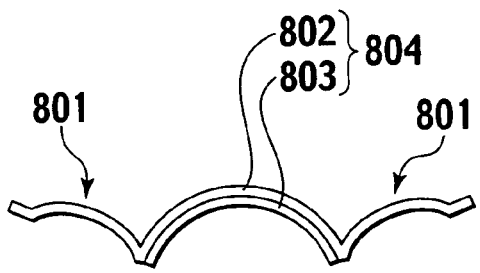
FIG. 9A is a cross sectional view of an electroacoustic transducer diaphragm for an earphone or a headphone according to the present invention.

In a shape forming step 106 in FIG. 1, by use of a punching die having a predetermined shape, the molded product 12 is formed punched into a predetermined external size. Then, the molded product 12 is coated with moisture resistant resin. With this process, it is different from the FIG. 2F, a diaphragm 804, which does not have a central opening 15, used for earphones and headphones, is formed. The obtained diaphragm 804 is shown in FIG. 9A.

Eighth Embodiment

An eighth embodiment of the present invention will be described below with reference to FIGS. 1 and 3A to 3F.

Firstly, in a immersing step 101 in FIG. 1, as shown in FIG. 3A, an adhered sheet 16 is produced by adhering a material other than wood 19 on one surface of a wooden sheet 17 having a thickness of approximately 0.25 mm via an adhesive layer 18 therebetween. As shown in FIG. 3B, the adhered sheet 16 is cut into a preferred size and immersed in a solution 20 which contains 5 wt % of ethylene glycol and 0.1 wt % of sodium di-(2-ethylhexyl) sulfosuccinate. The adhered sheet 16 is kept immersed until it become's flexible (approximately 20 minutes). Here, when a small amount of ethyl alcohol is dissolved in the solution 20, it reduces the time of drying the workpiece. Here, ethylene glycol and ethyl alcohol work as wetting agents and sodium di(2-ethylhexyl) sulfosuccinate is a kind of dialkyl sulfosuccinate and works as a penetrating agent. Further, the material 19 may work as a reinforcing agent for reinforcing the wooden sheet 2. The material other than wood material 19 is, for example, non-woven cloth or 4-axis woven cloth.

In a first hot press molding step 102 in FIG. 1, as shown in FIG. 3C, the flexible adhered sheet 16 is hot press molded by a mold 21 which is heated to temperatures of 100° C. or more in advance. The mold 21 is a mold of a male-female type which is composed of a male mold 22 and a female mold 23 and includes heaters 24, 25. In this process, since the solution 20 does not contain any lubricant, no extraneous material will be generated in the mold 21 when the workpiece is hot press molded. Thus, it prevents the adhered sheet 16 is burned in the mold 21 and a preferable molded product having no damage, such as a crack, is obtained.

In a thermosetting resin impregnating step 103 in FIG. 1, the molded product 26 obtained in the first hot press molding step 102 is impregnated in thermosetting resin solution 27, as shown in FIG. 3D. At the same time, an oscillation implemented by an ultrasonic oscillator 28a is induced in the thermosetting resin solution 27. The molded product 26 is immersed until it is sufficiently impregnated with the thermosetting resin (approximately 5 minutes). Impregnation of the molded product using such an ultrasonic wave reduces the time required for sufficient impregnation of the thermosetting resin by about at one-tenth, compared to a case when impregnation is implemented without ultrasonic oscillation. Further, the obtained molded product 26, which is placed under a condition at temperature of 60° C., 90% of relative humidity for 24 hours after impregnation, is observed. Observed molded product 26 shows that impregnation of the molded product 26 with ultrasonic oscillation prevents deformations of the obtained molded product 26, compared to a case when impregnation is implemented without ultrasonic oscillation.

In a drying step 104 in FIG. 1, the molded product 26 which is impregnated with the thermosetting resin is dried artificially at room temperature by blowing air with a fan 29a as shown in FIG. 3E. It is found that such an artificial drying at room temperature air reduces damage occurrence provided by a subsequent second hot press molding by about one-tenth, compared to a case when it is dried at high temperature (for example, drying with an infrared lamp or artificial drying with hot air).

In a second hot press molding step 105 in FIG. 1, the mold 21 shown in FIG. 3C is heated to temperatures of 150° C. or more in advance and the molded product 26 is hot press molded again.

As described above, the molded product 26, which is formed in a diaphragm shape in the first hot press molding step 102, is firstly impregnated with thermosetting resin, and then, hot press molded again in the second hot press molding step 105. With this process, shape retention property of the molded product 26 is improved to prevent an easy return to its original shape easily so that the yield rate is increased.

In a shape forming step 106 in FIG. 1, in use of a punching die in having predetermined shape, a central opening (not shown) is formed in the molded product 26. The molded product 26 is formed into a predetermined external size and is coated with moisture resistant resin. Accordingly, a diaphragm 804, which does not have a central opening 15, used for earphones and headphones is formed. The obtained diaphragm 804 is shown in FIG. 9A.

(Structure of Speaker)

Figure 8:
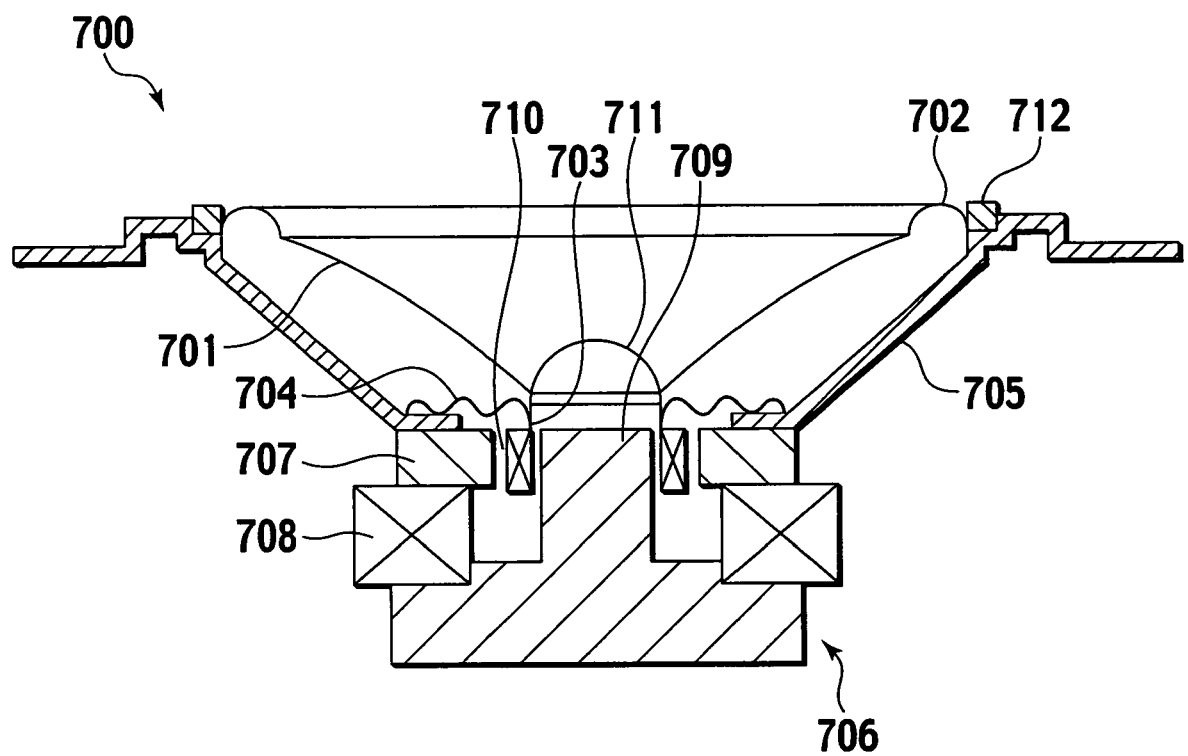
FIG. 8 is a cross sectional view of a speaker using an electroacoustic transducer diaphragm according to the present invention.

FIG. 8 is a cross-sectional view of a speaker using an electroacoustic transducer diaphragm according to the first to sixth embodiments.

According to a speaker 700, a rubber edge 702 having a predetermined shape is adhered to the entire outer periphery of a conical acoustic diaphragm 701 formed by any one of the production methods according to the first to the sixth embodiments, and a bobbin of a voice coil 703 having a predetermined shape (a predetermined damper 704 is previously adhered to the bobbin) is adhered in a central opening of the acoustic diaphragm 701.

These three integral parts are attached by adhesion to a predetermined speaker housing 705 (a predetermined magnetic circuit 706 is previously disposed). A conductive metal wire (not shown) is pulled out from the voice coil 703. The metal wire is connected to a terminal (not shown, and it is previously insulated from the metal housing 705) mounted on the housing 705.

The magnetic circuit 706 includes a ring-shaped plate 707, a ring-shaped magnet 708, a pole 709, and the like. The voice coil 703 is loosely inserted into a magnetic gap 710 formed between the plate 707 and the pole 709. The speaker is completed by polarizing the magnet 708. Reference number 711 represents a dust cap for preventing foreign matter from entering the voice coil 703. Reference number 712 represents an annular gasket for pressing an end of the edge 702.

The speaker 700 has the speaker diaphragm 701 formed of a wooden sheet and having a substantially even thickness so as to achieve excellent acoustic properties with a clear reproduced sound and small distortion.

A speaker diaphragm formed of a wooden sheet provides reproduced sound close to natural sound and vividly reproduces, especially, alto sounds such as a human voice and the sound of a violin. Further, since the speaker diaphragm provides an appearance with a high quality texture, it can be used for high-class speakers for high sound quality and high-class appearance, high-class home theater systems, monitors at a broadcast station, and the like.

(Structure of Earphones or Headphones)

FIG. 9A is a cross-sectional view showing a diaphragm for earphones or headphones according to the seventh and eighth embodiments of the present invention.

In FIG. 9A, an edge 801 having a predetermined shape is adhered to the entire outer periphery of a dome-shaped diaphragm 804 provided by a wooden sheet 802 and a sheet member 803, which is made of a material different from the wooden sheet 803, by any one of the production methods according to the seventh and the eighth embodiments. The edge 801 is made of rubber or nonrigid plastic film.

Figure 9B:
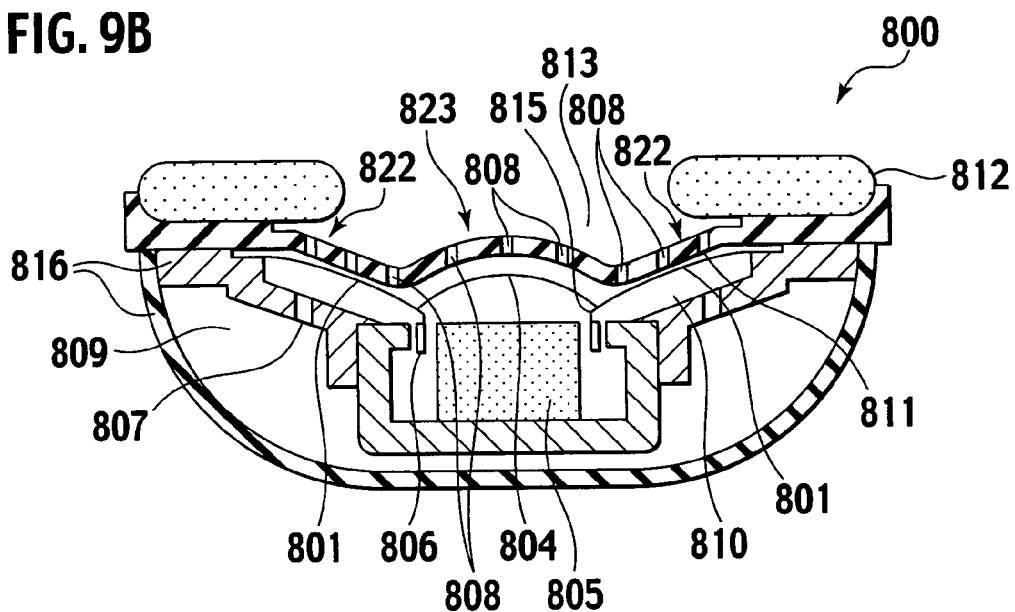
FIG. 9B is a cross sectional view of a headphone using an electroacoustic transducer diaphragm according to the present invention.

FIG. 9B is a cross-sectional view showing an example of a headphone using a diaphragm according to the seventh and eighth embodiments. According to a headphone 800 shown in FIG. 9B, a bobbin (voice coil bobbin) having a voice coil 806 having a predetermined shape is adhered in a center of the diaphragm according to the seventh and eighth embodiments. The outer periphery of the diaphragm 804 is adhered to a chassis 816 which comprises a back chamber 809 so that the diaphragm 804 is fixed to the chassis 816. Since current flows in the voice coil 806 in the side of a permanent magnet 805, a mechanical driving force is generated to the voice coil 806. The driving force is transferred to the diaphragm 804 via the voice coil bobbin 815. As a result, information of changes in current is transferred by movements of the diaphragm 804 to move air around the diaphragm 804 and sound including information is produced. The sound reaches to the ears of a listener (not shown) via an ear opening 813. Here, in order to prevent diffusion of sound to places other than the ears of the listener and shut out the noise from outside, an air pad 812 is provided to improve the contact between the side of a human face and the headphone 800. In order to make the movement of the diaphragm 804 more smooth and control the movement of air behind the diaphragm 804, a back pole chamber 810, a rear leakage hole 807, and a back chamber 809 are provided. Further, in order to control the movements of the whole diaphragm 804, a front pole chamber 811 are provided. A protection member 823 and a protection edge member 822 have a plurality of front leakage holes 808.

The structure shown in FIG. 9B may be modified to apply the diaphragm 804 shown in FIG. 9A to earphones. For example, as shown in FIG. 9C, a projection 917, which is to be inserted to the ears of a listener, may be provided at the center of an attaching face of the earphone.

Figure 9C:
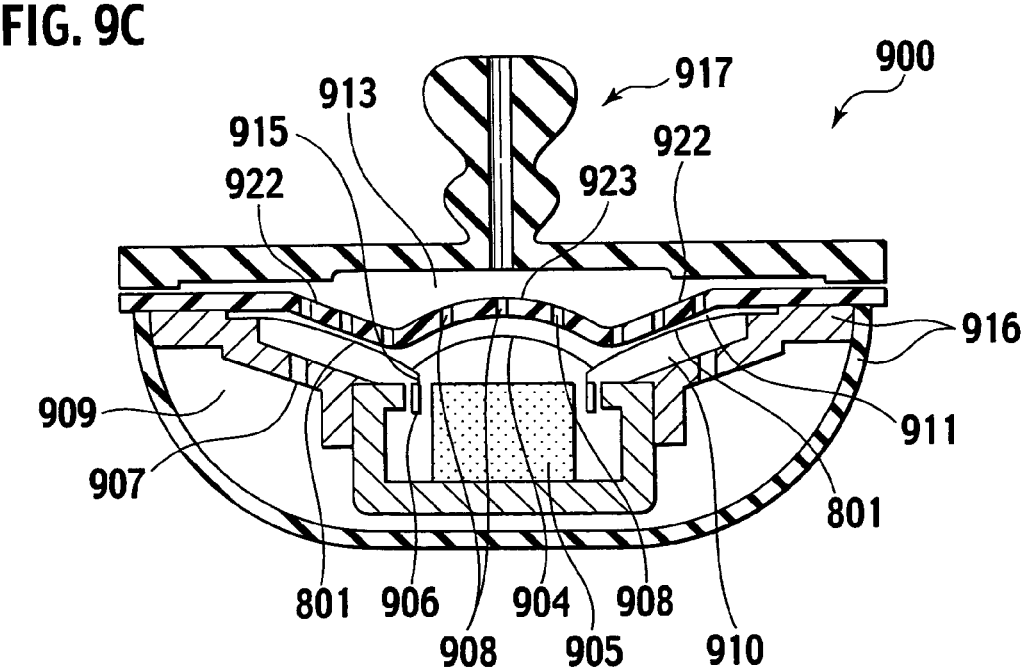
FIG. 9C is a cross sectional view of an earphone using an electroacoustic transducer diaphragm according to the present invention.

According to an earphone 900 shown in FIG. 9C, a bobbin (voice coil bobbin) having a voice coil 906 in a predetermined shape is adhered in a center of the diaphragm according to the seventh and eighth embodiments. The outer periphery of the diaphragm 904 is adhered to a chassis 916 which comprises a back chamber 909 so that the diaphragm 904 is fixed to the chassis 916. Since current flows in the voice coil 906 in the side of a permanent magnet 905, mechanical driving force is generated to the voice coil 906. The driving force is transferred to the diaphragm 904 via the voice coil bobbin 916. As a result, information of changes in current is transferred as movement of the diaphragm 904 to move air around the diaphragm and sound information is provided. The sound reaches the ears of a listener (not shown) via an ear opening 913. A projection 917 provided in front of the diaphragm 904 and a through hole where sound passes through is provided in the center of the projection 917. The projection 917 is inserted into the ears of a listener so that the diffusion of sound to places other than the ears of the listener is prevented and outside noise is shut out.

In order to make the movement of the diaphragm 904 more smooth and control the movements of air behind the diaphragm 904, a back pole chamber 910, a rear leakage hole 907, and a back chamber 909 are provided. In order to control the movements of the whole diaphragm 904, a front pole chamber 911 is provided. A protection member 923 and a protection edge member 922 have a plurality of front leakage holes 908.

It is noted that the above described speaker, headphones, and earphones are also referred to as electroacoustic transducers. The electroacoustic transducer includes buzzer or the like in addition to the above described embodiments.

According to the production method of the present invention, it is possible to produce this type of electroacoustic transducer diaphragm at a low cost. Thus, the production method of the present invention can be applied not only to the above described expensive products but also to stationary audio instruments, portable audio instruments and the like.

According to the production method of the present invention, stretchability of a wooden sheet is improved so that it can be formed in more finished shapes. Thus, the production method of the present invention can be applied to high-fashion products which require various shapes or compact products which require space-saving limitations.

Therefore, the production method of the present invention is extremely useful since it provides a great deal of satisfaction in various kinds of products.

It should be understood that many modifications and adaptations of the invention will become apparent to those skilled in the art and it is intended to encompass such obvious modifications and changes in the scope of the claims appended hereto.

What is claimed is:

1. A production method for an electroacoustic transducer diaphragm, comprising:

a producing step of producing an adhered sheet by adhering a sheet member on a surface of a wooden sheet having a thickness of from 0.01 mm to 3 mm, and the sheet member being made of a material different from the wooden sheet;

an immersing step of immersing the adhered sheet into one of a solution including 0.01-1 wt % of a penetrating agent and a solution including 0.01-1 wt % of the penetrating agent and 0.01-20 wt % of a wetting agent; and a first hot press molding step of molding an adhered sheet obtained by the immersing step so that the immersed adhered sheet has a predetermined shape of the electroacoustic transducer diaphragm, wherein the penetrating agent is one of sodium butyl naphthalene sulfonate, sodium di(2-ethylhexyl) sulfosuccinate, sodium lauryl sulfate, and a combination thereof;

the wetting agent is one of a of monovalent alcohol, dihydric alcohol, triatomic alcohol, ethylene glycol, butyl glycol, propyl glycol, sugars, mucopolysaccharides, sugar alcohols, water-soluble proteins and a combination thereof; and the solution contains 0.05-0.1 wt % of sodium di(2-ethylhexyl) sulfosuccinate.

2. The method of claim 1, wherein the solution further contains 5 wt % of ethylene glycol.

3. The method of claim 1, wherein the solution further contains 10 wt % of ethyl alcohol.

4. The method of claim 1, wherein the solution further contains 5 wt % of glucose.

5. A production method for an electroacoustic transducer diaphragm, comprising:

a producing step of producing an adhered sheet by adhering a sheet member on a surface of a wooden sheet having a thickness of from 0.01 mm to 3 mm, and the sheet member being made of a material different from the wooden sheet;

an immersing step of immersing the adhered sheet into one of a solution including 0.01-1 wt % of a penetrating agent and a solution including 0.01-1 wt % of the penetrating agent and 0.01-20 wt % of a wetting agent; and a first hot press molding step of molding an adhered sheet obtained by the immersing step so that the immersed adhered sheet has a predetermined shape of the electroacoustic transducer diaphragm, wherein the penetrating agent is one of sodium butyl naphthalene sulfonate, sodium di(2-ethylhexyl) sulfosuccinate, sodium lauryl sulfate, and a combination thereof;

the wetting agent is one of a of monovalent alcohol, dihydric alcohol, triatomic alcohol, ethylene glycol, butyl glycol, propyl glycol, sugars, mucopolysaccharides, sugar alcohols, water-soluble proteins and a combination thereof; and the solution contains 0.02 wt % of sodium lauryl sulfate and 5 wt % of glucose.

* * * * *